United States Patent [19]

Chambers et al.

[11] Patent Number: 5,145,906

[45] Date of Patent: Sep. 8, 1992

[54] SUPER-ABSORBENT POLYMER HAVING IMPROVED ABSORBENCY PROPERTIES

[75] Inventors: Douglas R. Chambers; Hubert H. Fowler, Jr., both of Chesapeake, Va.; Yoji Fujiura; Fusayoshi Masuda, both of Kyoto, Japan

[73] Assignee: Hoechst Celanese Corporation, Portsmouth, Va.

[21] Appl. No.: 685,974

[22] Filed: Apr. 15, 1991

Related U.S. Application Data

[63] Continuation of Ser. No. 413,760, Sep. 28, 1989, abandoned.

[51] Int. Cl.$^5$ .................................................. C08K 5/04
[52] U.S. Cl. .................................... 524/732; 524/734; 525/119; 525/327.8; 527/314
[58] Field of Search ................ 524/732, 734; 525/119, 525/327.8; 527/314

[56] References Cited

U.S. PATENT DOCUMENTS

| | | | |
|---|---|---|---|
| 4,295,987 | 10/1981 | Parks | 526/86 |
| 4,654,039 | 3/1987 | Brandt et al. | 526/207 |
| 4,800,220 | 1/1989 | Ribba | 526/271 |
| 4,820,773 | 4/1989 | Alexander et al. | 526/203 |

FOREIGN PATENT DOCUMENTS 0189163  7/1986  European Pat. Off. .

*Primary Examiner*—Joseph L. Schofer
*Assistant Examiner*—R. H. Delmendo
*Attorney, Agent, or Firm*—Herbert P. Price

[57] ABSTRACT

Super-absorbent polymers having superior dryness properties when incorporated into absorbent articles are made from acrylic acid and crosslinking agent polymerized under controlled conditions.

7 Claims, No Drawings

SUPER-ABSORBENT POLYMER HAVING IMPROVED ABSORBENCY PROPERTIES

This is a continuation of copending application Ser. No. 413,760 filed on Sept. 28, 1989, now abandoned.

BACKGROUND OF THE INVENTION

The field of art to which this invention is directed is hydrogel-forming polymer compositions made from crosslinked polyacrylic acid.

Water-insoluble hydrogel-forming polymers which are capable of absorbing large quantities of water and aqueous fluid are well known compositions. Such polymers, which are known as super-absorbent polymers, are lightly crosslinked acid functional polymers which swell in water or aqueous fluids but do not dissolve in the fluids. Super-absorbent polymers have been found to be particularly useful in diapers, feminine hygiene articles and surgical dressings. Descriptions of super-absorbent polymers and their uses are found in U.S. Pat. Nos. 3,669,103 and 3,670,731.

U.S. Pat. No. 4,654,039 (Reissue No. 32,649) is directed to hydrogel forming polymer compositions which are described as substantially water-insoluble, slightly cross-linked, partially neutralized polymers, derived from unsaturated polymerizable, acid group-containing monomers and cross-linking agents. Such polymers are made by polymerizing the acid monomer and the crosslinking monomer in water using a redox catalyst system, followed by partially neutralizing the acid groups with sodium hydroxide, then drying the polymer and pulverizing it to a powder.

British Patent No. 2,119,384 discloses super-absorbent polymers made by polymerizing in water acrylic acid in admixture with sodium acrylate and a crosslinking monomer using a persulfate catalyst, followed by drying and then heating with a crosslinking agent having at least two functional groups capable of reacting with carboxyl groups.

In U.S. Pat. No. 4,497,930, super-absorbent polymers are made by polymerizing acrylic acid in an inverse emulsion process followed by crosslinking the polymer with a diepoxide compound.

According to U.S. Pat. No. 4,295,987, super-absorbent polymers are made by polymerizing acrylic acid and a multifunctional acrylate monomer in water using a persulfate catalyst followed by neutralizing the acid groups with caustic and then blending in a divalent cation salt, e.g., zinc acetate, for additional crosslinking.

Numerous other patents disclose super-absorbent polymers and their uses, such as U.S. Pat. Nos. 4,076,663, 4,552,938, 4,507,438 and 4,535,098.

Many improvements have been made in the performance and properties of super-absorbent polymers over the years, such as in gel strength and reabsorbing capacity. However, such super-absorbent polymers do not have a balance of properties. Typically, polymers with high gel strength exhibit reduced reabsorbing capacity, which results, for example, in reduced diaper dryness. Polymers with increased reabsorbing capacity exhibit low absorbency under pressure and a reduced elasticity modulus which also reduces diaper dryness.

There is a need for a super-absorbent polymer having a balance of properties which, when the polymer is used in a diaper, results in improved diaper dryness.

SUMMARY OF INVENTION

This invention is directed to super-absorbent polymers, i.e., hydrogel forming polymers. In one aspect, this invention pertains to an improved super-absorbent polymer composition. In another aspect, this invention relates to a process for making super-absorbent polymers. In yet another aspect, this invention pertains to articles made with super-absorbent polymers.

The super-absorbent polymer of this invention is made by forming an aqueous solution of acrylic acid, a crosslinking monomer which is a polyethylenically unsaturated polymerizable monomer and, optionally, a polysaccharide, adding to the aqueous solution a redox catalyst system and a thermal free radical initiator, allowing the temperature to rise to a peak temperature under adiabatic conditions, holding at the peak temperature to reduce the free monomer content to less than 1000 ppm, neutralizing 50 to 100 percent of the acid groups of the resulting polymer with a base, adding a multifunctional compound having at least two groups capable of forming ionic or covalent bonds with carboxylic acid groups, drying the polymer to a moisture content below about 10 weight percent, and pulverizing the dried polymer to a powder.

The super absorbent polymer of this invention exhibits:
absorbency under pressure of 28 g/g minimum;
reabsorbing capacity of 35 g/g minimum;
elasticity modulus of $8.0 \times 10^4$ dynes/cm$^2$ minimum.

Articles made with the super-absorbent polymer of this invention exhibits dryness values of at least 40.

DESCRIPTION OF THE INVENTION

The primary monomer used to make the super-absorbent polymer of this invention is acrylic acid. The crosslinking monomer copolymerized with acrylic acid is a polyethylenically unsaturated polymerizable monomer having at least two polymerizable groups per molecule and which is soluble in water or in an acrylic acid-water solution. Examples of polymerizable groups are acrylic groups, methacrylic groups, allyl groups and vinyl groups. Crosslinking monomers include polyacrylic esters of polyols, polymethacrylic esters of polyols, polyallyl amines, polyallyl ethers, polyacrylamido compounds, polymethacrylamido compounds and divinyl-compounds. Specific examples of crosslinking monomers are tetrallyloxyethane, N,N'-methylene bisacrylamide, N,N'-methylene bismethacrylamide, triallylamine, trimethylol propane triacrylate, glycerol propoxy triacrylate, divinyl benzene and the like.

Optional component used in making the super-absorbent polymers of this invention are water soluble polysaccharides, examples of which are starches, water soluble celluloses and polygalactommans. Suitable starches include the natural starches, such as sweet potato starch, potato starch, wheat starch, corn starch, rice starch, tapioca starch and the like. Processed or modified starches, such as dialdehyde starch, alkyl-etherified starch, allyl-etherified starch, oxyalkylated starch, aminoethyl-etherified starch, and cyanoethyl-etherified starch are also suitable.

The water-soluble celluloses useful in this invention are those obtained from such sources as wood, stems, bast, seed fluffs and the like which are then derivatized to form hydroxyalkyl cellulose, carboxymethyl cellulose, methyl cellulose and the like.

Suitable polygalactomannans are guar gum and locust bean gums as well as the hydroxyalkyl, carboxyalkyl, and aminoalkyl derivatives.

The preferred polysaccharide for use in this invention is natural starch, such as wheat starch, corn starch and the alpha starches.

In preparing the super-absorbent polymer of this invention, the acrylic acid and the water soluble polysaccharide are reacted in the amount of about 90 to about 100 weight percent acrylic acid and 0 to about 10 weight percent water soluble polysaccharide, said weight percents being based on the weights of acrylic acid and polysaccharide. The amount of polyethylenically unsaturated crosslinking monomer will vary from about 0.075 to about 1 mole percent based on the moles of acrylic acid and preferably about 0.1 to about 0.3 mole percent.

The polymerization catalysts used in this invention are both the redox class and the thermal class. The redox class catalysts are used to initiate and to substantially complete the polymerization reaction. The thermal catalysts are used to ensure that the free monomer content of the product is reduced below 1000 ppm by weight.

Referring to the redox catalysts, any of the well known water soluble reducing agents and oxidizing agents can be used in this invention. Examples of reducing agents include such compounds as ascorbic acid, alkali metal sulfites, alkali metal bisulfites, ammonium sulfite, ammonium bisulfite, alkali metal hydrogen sulfite, ammonium hydrogen sulfite, ferrous metal salts, e.g., ferrous sulfate, sugars, aldehydes, primary and secondary alcohols, and the like.

Oxidizing agents include such compound as hydrogen peroxide, alkali metal persulfate, ammonium persulfate, alkylhydroperoxides, peresters, diacryl peroxides, silver salts, and the like. A particularly preferred redox catalyst pair is ascorbic acid and hydrogen peroxide.

In order to obtain super absorbent polymers having the superior properties as claimed in this invention, the reducing agent must be used in the amounts of about $6 \times 10^{-5}$ to about $2.5 \times 10^{-3}$ mole percent based on mole of acrylic acid and preferably, $6 \times 10^{-4}$ to $2.5 \times 10^{-3}$ mole percent. The amount of oxidizing agent used will vary from about $3.4 \times 10^{-3}$ to 0.42 mole percent, and preferably, about 0.15 to about 0.25 mole percent said mole percents being based on moles of acrylic acid.

In order to ensure complete polymerization of the acrylic acid monomer and the crosslinking monomer, a thermal catalyst is also included in the polymerization process. Useful thermal initiators are the "azo" initiators, i.e., compounds which contain the —N=N-structure. Any of the azo compounds which have some solubility in water or in an acyrlic acid-water mixture and which have a 10 hour half life at 30° C. or above can be used. Examples of useful azo initiators are 2,2'-azobis-(amidino propane) dihydrochloride, 4,4'-azobis(cyanovaleric acid), 4,4'-butylazo- cyanovaleric acid, 2,2'-azobis(isobutyronitrile, and the like. A preferred azo initiator for use in this invention is 2,2'-azobis(amidinopropane) dihydrochloride. The thermal initiators are used in the amount of about 0.1 to about 0.4 weight percent and preferably, 0.25 to 0.35 weight percent, wherein said weight percents are based on the weight of acrylic acid.

The polymerization process for preparing the compositions of this invention is conducted in water wherein the acrylic acid and the polysaccharide are present in a concentration of about 5 to about 30 weight percent, wherein the weight percent is based on the total weight of water, acrylic acid and polysaccharide.

The process used to prepare the compositions of this invention is an adiabatic reaction which is initiated at a temperature of about 5° to about 20° C. and which causes a rise in temperature which does not exceed a peak temperature of about 90° C. Generally, the peak temperature will be about 60° C. to about 75° C. The time required to reach peak temperature will vary depending upon the concentration of monomers, the amount of catalysts and the specific catalysts used as well as the size of the reaction batch and whether or not the reactor is insulated. Generally, this time will be about 1 to about 2 hours. After the peak temperature is reached, the temperature is held within about 10° C. of the peak temperature, and preferably within about 5° C. for about 1 to about 12 hours to ensure that the polymerization is complete and that the residual monomer content is below 1000 ppm.

The carboxylic acid groups of the composition of this invention are then neutralized with a base in the amount of about 50 to about 100 mole percent, preferably about 65 to about 75 mole percent. The preferred bases are the alkali metal hydroxides with the most preferred base being sodium hydroxide. Other bases, such as alkaline earth metal hydroxides, ammonium hydroxide, alkali metal, alkaline earth metal and ammonium carbonates, bicarbonates, and alcoholates, amines and the like can also be used.

The post-crosslinking compound, which is added to the reactants after the neutralization step is any compound which has at least two reactive moieties which can react with or form a bond with carboxylic acid or salt groups and which is somewhat water soluble. Organic compounds which contain epoxy groups, hydroxyl groups, amine groups, phenolic groups and halohydrin groups are suitable for such use. Additional useful compounds are multivalent metals, such as zinc, titanium, aluminum and zirconium, which form ionic bonds with carboxylic groups.

Examples of useful post-crosslinking compounds are ethylene glycol diglycidyl ether, epichlorohydrin, glycerol, ethylene diamine, bisphenol A, aluminum hydroxide, zinc nitrate, titanium lactate, zirconium lactate, and the like.

The post crosslinking compound is added to the polymer in the amount of about 0.05 to about 15 mole percent based on the moles of acrylic acid and preferably, when the crosslinking compound is a diglycidyl ether, in the amount of about 0.05 to about 0.15 mole percent.

As stated hereinbefore, the polymerization reaction is an adiabatic reaction conducted without the application of external heat. The monomers, i.e., acrylic acid, the crosslinking monomer and the polysaccharide if used are dissolved in water in the reactor. Dissolved oxygen is removed from the solution by a sparge of inert gas, e.g., nitrogen, and the temperature is lowered to about 5° to about 20° C. The polymerization catalysts, i.e., the thermal initiator, the reducing agent and the oxidizing agent are added to the reactor with thorough mixing. After a short induction period, polymerization begins as indicated by a rise in temperature. Peak temperatures are reached in about 1 to 3 hours. The peak temperature is controlled, if necessary, so as not to exceed about 90°. Generally, the peak temperature will be about 60° to about 75° C. After the peak temperature is reached, the polymer is kept in a heat insulated container (which can be the reactor) for a time sufficient for the polymerization reaction to be completed as evidenced by the monomer content being reduced below 1000 ppm. Generally this time will be about 2 to about 12 hours.

When the polymerization reaction is complete, the polymer gel is removed and is chopped into small particles. An aqueous base is then added to neutralize some or all of the acid groups. The gel is again chopped to ensure uniform mixing of the base with the polymer. An aqueous solution of a post-crosslinking agent is then added and the gel is again chopped to ensure uniform mixing. The gel is then heated at a temperature of about 20° to about 200° C. to effect reaction of the post-crosslinking agent with the carboxylic acid groups. This heating period will be about 0.1 to about 3 hours. When the reaction is completed, the polymer gel is then heated at about 100° C. to about 200° C. to dry the polymer to a moisture content of less than about 110 weight percent. Alternately, the post-crosslinking reaction can be conducted during the drying process. The dried polymer is then ground and sieved to a particle size of about 20 to about 400 mesh U.S. Standard Sieve.

In order to evaluate the polymer properties of the super-absorbent polymer, a model diaper is used. The diaper is constructed by placing a layer of pulp (14×37 cm) having a basis weight of 200 g/m² on a nonwoven backsheet. The super-absorbent polymer, 5 gms, is then spread on the pulp layer as uniformly as possible. The polymer is then covered with a layer of pulp (14×37 cm) having a basis weight of 100 g/m² and a nonwoven top sheet.

The testing of the model diaper is conducted as follows:

1) 50 mls of a 0.9 weight percent aqueous saline solution are poured onto the center of the diaper at 5 minute intervals until a total of 150 mls. of solution have been applied;

2) at 5 minutes and at 2 hours after the final addition of saline solution to the diaper, the dryness of the diaper is evaluated by 10 trained people who touch the diaper and each rate it from 1 to 5 at each time interval. The rating description is:
   5—completely dry
   4—slightly damp
   3—damp
   2—slightly wet
   1—completely wet 3) The ratings by each person are added together for each time interval.

The lowest possible rating using the about described test is and the highest is 50. The dryness rating for diapers using the super-absorbent polymers of this invention is at least 40.

The super-absorbent polymer of this invention is also evaluated by the following tests:

1) Absorbency Under Pressure

This test determines the ability of a super-absorbent polymer to absorb under a pressure of 20 g/cm² (i.e., child sitting down)

2) Reabsorbent Capacity

This test determines the ability of a super-absorbent polymer to absorb after it is partially hydrated (10 g/g saline concentration) and sheared a total of 50 times under a pressure of 22 g/cm² (i.e., slightly wet diaper being subjected to the stress of lying or sitting).

3) Elasticity Modulus

This test determines the ability of the super-absorbent polymer to retain its integrity when it is totally saturated to prevent structure collapse and loss of fluid (i.e., child sitting on wet diaper)

Absorbency under Pressure in measured using an Automatic Absorbency Tester, Model KM 350 (Kyowa Seiko Co., Ltd) and a plastic tube having a inner diameter of 28 mm and a length of 50 mm with a wire net (100 mesh) at the bottom of the tube. Samples having a mesh size of 32–100 are used in the test.

A test sample, 0.100±0.01 g., is placed in the plastic tube and is spread evenly over the wire net. A 120 g weight is placed on the sample. The plastic tube is placed at the center of the porous plate of the Tester under which is a reservoir containing saline solution (0.90 wt/vol. % NaCl aqueous solution). After 1 hour of absorption, the volume of absorbed saline solution is determined (a ml). A blank is run using the same procedure without the super-absorbent polymer (b ml). Absorbency under Pressure is equal to (a-b)×10.

Reabsorbing Capacity is determined as follows: a test sample, 1.00 g, is placed in a beaker containing 10.0 g of saline solution (0.9 wt/vol % NaCl aqueous solution) and is left for 1 hour in order to obtain a uniform gel. The gel is then placed in a polyethylene bag which is sealed after removing the inside air. The bag containing the gel is placed on a press roller and is sheared under the following conditions:

| | |
|---|---|
| Wt. of roller: | 1 kg. |
| Shearing speed by roller: | 1 min./round |
| Rolling frequency: | 50 times |
| Shear loading pressure: | 22 g/cm² |

The Reabsorbing Capacity of the gel is then determined on 1.10 g of the sheared gel placed in a plastic tube using the procedure described under Absorbency under Pressure.

Elasticity Modulus is determined as follows: a test sample, 0.50 g., is placed in a beaker with 25.0 g of synthetic urine (aqueous solution of 0.8 weight percent NaCl, 2.0 weight percent urea, 0.08 weight percent Mg SO$_4$ 7H$_2$O, 0.03 weight percent CaCl$_2$, said weight percents being based on weight of solution) and is left for 1 to 3 hours in order to obtain a uniform gel. A portion of the gel, 0.2 g±0.01g, is then placed on a Creep Meter, Model RE 3305 (Yamaden Co., Ltd.) and the resistance to deformation is measured under a constant load of 15 g/cm².

The Elasticity Modulus in dynes/cm² is calculated from the ratio of the unit stress to the unit deformation.

The following examples describe the invention in detail. Part and percentages unless otherwise designated are parts and percentages by weight.

EXAMPLE 1

To a suitable reactor were added 800 parts of acrylic acid, 4 parts of tetraallyloxyethane, 1818.2 parts of 2.2 percent oxidized starch in water and 1347.8 parts of water. Nitrogen was bubbled through the solution and the temperature was lowered to 10° C. When the dissolved oxygen was reduced below 1 ppm, the following catalysts were added in the listed order:
   2.4 parts of 2,2-azobisamidino propane dihydrochloride in 10 parts of water;
   0.2 part of ascorbic acid in 10 parts of water;

2.29 parts of 35 percent hydrogen peroxide in 10 parts of water.

After a short induction period, polymerization began and a peak temperature of 65°–70° C. was reached in two hours. The product gel was kept in an insulated container for 3 hours to reduce residual monomer below 1000 ppm.

To the polymer gel after being chopped in a meat grinder were added 640 parts of a 50 percent solution of sodium hydroxide in water. The temperature of the gel was about 66° C. before the caustic addition and the temperature of the caustic solution was 38° C. The gel was again chopped to mix in the basic solution for uniform neutralization. To the gel, which had exothermed to a temperature of 88°–93° C., were then added 2.4 parts of ethylene glycol diglycidyl ether in 50 parts of water, the temperature of the solution being 24° C. The gel was again chopped to obtain uniform distribution of the post crosslinking agent. The polymer was then dried to a moisture content of 10 percent on a rotary type drum dryer at 105° C. The resulting flake polymer was then ground and sieved to a particle size of 20–400 mesh (U.S. Standard Sieve).

The polymer exhibited the following properties:

| | |
|---|---|
| Absorbency under pressure (Ab. under P) | 29 g/g |
| Reabsorbing capacity (Reab Cap.) | 39 g/g |
| Elasticity modulus (Elast. Mod) | $8.8 \times 10^4$ dynes/crm$^2$ |
| Model diaper dryness | 5 minutes - 43 |
| | 2 hours - 43 |

EXAMPLE 2

A polymer was prepared using the same procedure and components as described in Example 1 except that the initial monomer solution was made of 800 parts of acrylic acid, 4 parts of tetraallyloxyethane and 3166 parts of water.

The resulting polymer had the following properties:

| | |
|---|---|
| Absorbency under pressure | 34 g/g |
| Reabsorbing capacity | 41 g/g |
| Elasticity modulus | $11.2 \times 10^4$ dynes/cm$^2$ |
| Model diaper dryness | 5 minutes - 45 |
| | 2 hours - 46 |

EXAMPLE 3

A number of polymers were prepared using the same procedure described in Example 2 except that the mole percent ascorbic acid to moles of acrylic acid was varied. The polymer properties were as follows:

| Example | 3a | 3b | 3c | 3d |
|---|---|---|---|---|
| Mole % Ascorbic Acid | $6.3 \times 10^{-4}$ | $1.9 \times 10^{-3}$ | $3.15 \times 10^{-3}$ | $6.3 \times 10^{-3}$ |
| Ab. under P g/g | 35 | 32 | 28 | 20 |
| Reab. Cap. g/g | 43 | 40 | 38 | 35 |
| Elast Mod $\times 10^4$ dynes/cm$^2$ | 11.2 | 10.8 | 10.5 | 10.2 |
| Model Diaper Dryness | | | | |
| 5 minutes | 45 | 43 | 40 | 28 |
| 2 hours | 48 | 47 | 42 | 25 |

This example demonstrates the criticality of the amount of reducing agent used in the redox polymerization reaction. Example 3d which contained a high amount of ascorbic acid produced a polymer with inferior properties.

EXAMPLE 4

A number of polymers were prepared using the same procedure described in Example 2 except that the weight percent 2,2'-azobisamidino propane dihydrochloride (ABAPD) based on the weight of acrylic acid was varied. The polymer properties were as follows:

| Example | 4a | 4b | 4c | 4d |
|---|---|---|---|---|
| Wt % ABAPD | 0.1 | 0.3 | 0.4 | 0.5 |
| Ab under P g/g | 35 | 32 | 28 | 23 |
| Reab Cap. g/g | 41 | 40 | 38 | 35 |
| Elast Mod. $\times 10^4$ dynes/cm$^2$ | 11.2 | 10.9 | 10.5 | 10.2 |
| Model Diaper Dryness | | | | |
| 5 minutes | 45 | 43 | 40 | 38 |
| 2 hours | 50 | 45 | 40 | 32 |

This example demonstrates the criticality of the amount of thermal initiator. The properties of Example 4d which contained a high amount of ABAPD were inferior to those of the other examples.

EXAMPLE 5

A number of polymers were prepared using the same procedure described in Example 2 except that the mole percent of crosslinking monomer, tetraallyloxyethane (TAE) based on moles of acrylic acid was varied. The polymer properties were as follows:

| Example | 5a | 5b | 5c |
|---|---|---|---|
| Mole TAE | 0.057 | 0.143 | 0.286 |
| Ab under P g/g | 25 | 31 | 31 |
| Reab Cap g/g | 35 | 40 | 41 |
| Elast Mod. $\times 10^4$ dynes/cm$^2$ | 10.8 | 10.9 | 10.9 |
| Model Diaper Dryness | | | |
| 5 minutes | 28 | 41 | 41 |
| 2 hours | 24 | 45 | 45 |

This example demonstrates the criticality of the amount of crosslinking monomer. Example 5a contained less than the critical amount of TAE and had inferior properties.

EXAMPLE 6

A number of polymers were prepared using the same procedure described in Example 2 except the amount of post crosslinking compound, ethylene glycol diglycidyl ether (EGDE), was varied. The polymer properties were as follows:

| Example | 6a | 6b | 6c | 6d | 6e |
|---|---|---|---|---|---|
| Mole % EDGE | .032 | .064 | .096 | 0.13 | 0.16 |
| Ab under P g/g | 11 | 22 | 31 | 30 | 28 |
| Reab. Cap g/g | 40 | 41 | 38 | 35 | 33 |
| Elast. Mod. $\times 10^4$ | 7.0 | 8.8 | 10.5 | 10.8 | 11.0 |

-continued

| Example | 6a | 6b | 6c | 6d | 6e |
|---|---|---|---|---|---|
| dynes/cm² |  |  |  |  |  |
| Model. Diaper Dryness |  |  |  |  |  |
| 5 minutes | 11 | 32 | 40 | 42 | 40 |
| 2 hours | 30 | 45 | 45 | 40 | 35 |

This example demonstrates the criticality of the amount of post crosslinking compound. Only Examples 6C and 6d meet all the requirements.

EXAMPLE 7

Since glycidyl ethers, such as the diglycidyl ether of ethylene glycol, can partially hydrolyze under basic conditions in the presence of water and heat and thereby diminish their effectiveness as crosslinking agents, a polymer was prepared using the procedure described in Example 1 and the components described in Example 2 except that the neutralization and post crosslinking were conducted as follows:

To the polymer gel after being chopped in a meat grinder were added 1600 parts of a 20 percent solution of sodium hydroxide in water, the temperature of the solution being 16° C. The temperature of the gel before caustic addition was about 66° C. The gel was again chopped to mix in the basic solution for uniform neutralization. To the gel, the temperature of which was about 66° C., were added 1.25 parts of the diglycidyl ether of ethylene glycol (0.05 mole percent based on the moles of acrylic acid). The temperature of the diglycidyl ether was 4° C. The polymer was then heated, dried, and ground using the procedure described in Example 1. The polymer product had the following properties:

| Absorbency under Pressure | 31 g/g |
|---|---|
| Reabsorbing Capacity | 38 g/g |
| Elasticity Modulus | 10.5 dynes/cm² |
| Model diaper Dryness |  |
| 5 minutes | 40 |
| 2 hours | 45 |

By maintaining a maximum temperature of about 65°–70° C. during the addition and initial reaction of the diglycidyl ether, the effectiveness of the crosslinking agent is increased so that a satisfactory product can be obtained while using the diglycidyl ether in amounts as low as 0.05 mole percent based on moles of acrylic acid.

COMPARATIVE EXAMPLE A

Polymers used in commercially available diapers were tested and compared with the polymer of this invention. The results of these tests are shown as follows:

| Polymer | Dryness 5 min | 2 hrs | Ab under P g/g | Reab. Cap. g/g | Elast Mod. 10⁴ dynes/ cm² |
|---|---|---|---|---|---|
| Luvs Deluxe | 36 | 38 | 27 | 20 | 11.8 |
| Ultra Pampers Plus | 37 | 37 | 26 | 26 | 13.1 |
| Ultra Pampers | 34 | 36 | 23 | 28 | 9.9 |
| Snuggums Ultra | 34 | 38 | 24 | 29 | 8.4 |
| Regular Pampers | 31 | 33 | 25 | 23 | 12.7 |
| Huggies Supertrim | 31 | 35 | 21 | 31 | 7.8 |
| Thick Pampers | 29 | 33 | 25 | 27 | 8.6 |

-continued

| Polymer | Dryness 5 min | 2 hrs | Ab under P g/g | Reab. Cap. g/g | Elast Mod. 10⁴ dynes/ cm² |
|---|---|---|---|---|---|
| Plus |  |  |  |  |  |
| Sanwet IM-1500 | 30 | 38 | 12 | 38 | 7.4 |
| Sanwet IM-1000 | 22 | 35 | 3 | 10 | 4.7 |
| Invention | 43 | 43 | 29 | 38 | 8.8 |

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. A process of preparing a super-absorbent polymer which comprises:

(a) forming an aqueous solution of acrylic acid, a water soluble polysaccharide, and a multifunctional monomer, wherein said multifunctional monomer has at least two polymerizable ethylenically unsaturated double bonds per molecule, wherein said acrylic acid and said polysaccharide are present in the amount of about 90 to about 100 weight percent acrylic acid and about 0 to about 10 weight percent polysaccharide wherein said weight percents are based on the weight of the acrylic acid and the polysaccharide, wherein said multifunctional monomer is present in the amount of about 0.075 to about 1 mole percent based on the moles of acrylic acid, and wherein the acrylic acid and the polysaccharide are present in the aqueous solution in the amount of about 5 to about 30 weight percent wherein the weight percent is based on the weight of acrylic acid, polysaccharide and water;

(b) adding to the aqueous solution at a temperature of about 5° to about 20° C., a redox catalyst system and a thermal free radical initiator wherein the reducing agent part of the redox catalyst is present in the amount of about $6 \times 10^{-5}$ to about $2.5 \times 10^{-3}$ mole percent based the moles of acrylic acid, wherein the oxidizing agent part of the redox catalyst is present in the amount of about $3.4 \times 10^{-3}$ to about 0.42 mole percent based on the moles of acrylic acid and wherein the thermal free radical initiator is present in the amount of about 0.1 to about 0.4 weight percent based on the weight of acrylic acid, (c) allowing the exothermic temperature to rise under adiabatic conditions to a peak temperature not to exceed 90° C., thereby forming a polymer gel (d) holding the temperature within 10° C. of the peak temperature for a time sufficient to reduce residual monomer content below 1000 ppm;

(e) neutralizing about 50 to about 100 percent of the carboxylic acid groups in the polymer with an aqueous base;

(f) adding a multifunctional compound having at least two groups capable of forming ionic or covalent bonds with carboxylic acid groups wherein said multifunctional compound is added in the amount of about 0.05 to about 15 mole percent based on the moles of acrylic acid;

(g) heating at a temperature of about 20° C. to about 200° C. to dry the polymer to a moisture content below about 10 percent by weight;

(h) and grinding the polymer to a particle size of about 20 to 400 mesh (U.S. Standard Sieve).

2. The process of claim 1 wherein the polysaccharide is a natural starch.

3. The process of claim 1 wherein the multifunctional monomer is present in the amount of about 0.1 to about 0.3 mole percent, the reducing agent part of the redox catalyst system is present in the amount of about $6 \times 10^{-4}$ to about $2.5 \times 10^{-3}$ mole percent, the oxidizing agent part of the redox catalyst is present in the amount of about 0.15 to about 0.25 mole percent, the thermal free radical initiator is present in the amount of about 0.25 to about 0.35 weight percent and the multifunctional compound is added in the amount of about 0.05 to about 0.15 mole percent.

4. The process of claim 1 wherein the exothermic peak temperature is about 60° C. to about 75° C. and the temperature is held within 5° C. of the peak temperature.

5. The process of claim 1 wherein the polymer gel after the addition of the multifunctional compound is heated at about 100° C. to about 200° C. to effect the post-crosslinking reaction and to dry the polymer.

6. The process of claim 1 wherein the multifunctional monomer is tetraallyloxyethane and the post-crosslinking compound is the diglycidyl ether of ethylene glycol.

7. The process of claim 1 wherein the reducing agent is ascorbic acid, the oxidizing agent is hydrogen peroxide an the thermal free radical initiator is 2,2-azobisamidino propane dihydrochloride.

* * * * *